W. E. ASHTON.
GAS PURIFIER.
APPLICATION FILED DEC. 29, 1908.

929,270.

Patented July 27, 1909.

INVENTOR
William Easterly Ashton
BY
ATTORNEY.

UNITED STATES PATENT OFFICE.

WILLIAM EASTERLY ASHTON, OF PHILADELPHIA, PENNSYLVANIA.

GAS-PURIFIER.

No. 929,270.   Specification of Letters Patent.   Patented July 27, 1909.

Application filed December 29, 1908. Serial No. 469,810.

*To all whom it may concern:*

Be it known that I, WILLIAM EASTERLY ASHTON, a citizen of the United States, and a resident of the city of Philadelphia, county of Philadelphia, State of Pennsylvania, have invented certain new and useful Improvements in Gas-Purifiers, of which the following is a full, clear, and exact description, reference being had to the accompanying drawings.

This invention relates to improvements in gas purifiers, and more particularly to purifiers for acetylene gas, adapted to be used upon automobiles and boats in connection with acetylene lamps.

It is well known that much trouble has been experienced with acetylene lamps upon automobiles, owing to the clogging of the gas pipes and burners by the condensation of water and mineral impurities carried over by the gas, and various means have been devised for purifying the gas to prevent such trouble, but usually such devices either have been too complicated and expensive, or have failed to perform satisfactorily the work for which they were intended.

The main objects of this invention are to provide a simple, durable and inexpensive gas purifier of compact form and neat appearance, which may be used with any form of gas generator; to provide convenient means whereby the purifier may be connected to the frame of an automobile or to any other fixed support; to provide a purifier which may be readily taken apart for inspection or cleaning or removal of parts; to provide a purifier so constructed that all of the gas passing through the purifier will be thoroughly purified and dried, and to provide other improvements, as will appear hereinafter.

Figures 1, 2:
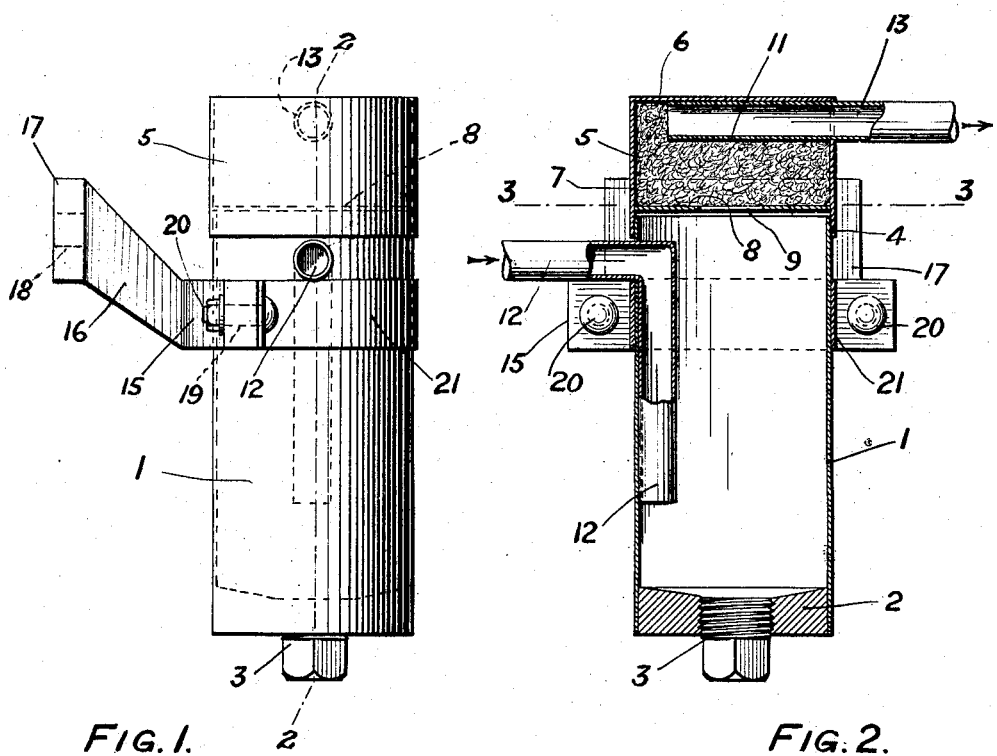
Figure 3:
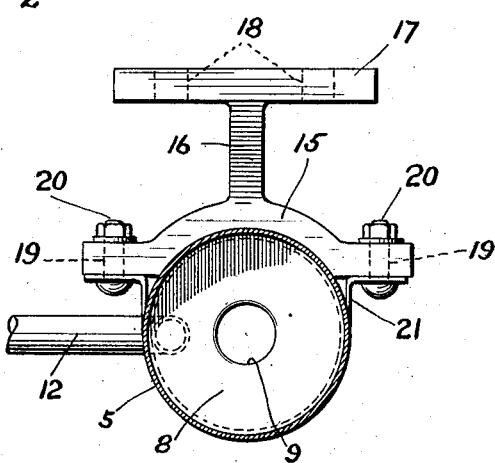

In the accompanying drawings, Figure 1 is a side elevation of a gas purifier constructed in accordance with this invention; Fig. 2 is a central vertical section of the same on line 2—2 of Fig. 1; and Fig. 3 a horizontal section on line 3—3 of Fig. 2.

Referring to the drawings, the improved gas purifier comprises a casing made of metal or other material impervious to gas and moisture having a main body portion 1 preferably of cylindrical form, arranged vertically when in operative position and closed at its lower end by a bottom 2, which is concave upon its upper or inner side, and is provided centrally with a threaded opening closed by a threaded plug 3. The upper end of the main portion 1 of the casing is open, and is provided with external screw threads 4, over which is threaded a cylindrical cover or cap 5, having a substantially flat, closed upper end 6. The cap 5 is provided above the screw threaded portion and in a plane perpendicular to the longitudinal axis of the cap with a permanently attached substantially flat annular diaphragm 8 having a circular opening 9 therethrough and concentric therewith, the diaphragm being made of a material practically impervious to gas.

The diaphragm 8 forms a horizontal partition between the upper and lower portions of the interior of the casing. The space within the cap above the diaphragm 8 forms a filtration chamber 11, which is filled with any suitable filtering material, the diaphragm constituting the bottom of the chamber.

The lower portion of the purifier is constructed to form a separator, and is provided with a gas inlet pipe 12, which enters the body portion 1 of the casing adjacent the lower edge of the cap 5, and beneath the diaphragm 8, preferably in a direction perpendicular to the longitudinal axis of the casing, and then turns at right angles downwardly parallel to the side of the casing, and is fixed in contact therewith, terminating in an open end preferably one inch from the bottom of the casing.

The purified gas is conducted from the purifier by an outlet pipe 13, which is preferably arranged diametrically of the purifier upon the under side of, and fixed in contact with the top of the cap of the purifier, the open inlet end of the pipe being within the filtration chamber adjacent the side of the chamber beyond the opening in the diaphragm between the filtration chamber and the separator 1. The inlet and outlet openings of the filtration chamber being thus spaced horizontally apart, the gas cannot escape by creeping vertically along the side walls of the chamber and must pass through the filtering material, whereby all of the gas passing through the purifier is thoroughly cleansed and dried. The diaphragm separating the filtration chamber from the separator prevents the gas in the separator from creeping vertically along the side walls of the casing into the opening of the outlet of the purifier, and directs it through the opening in the diaphragm which is covered by the filtering material forming a foraminous closure therefor. The filtration chamber is filled with any well-known filtering material for purifying the gas, such as charcoal or cotton.

In the operation of the purifier, the crude gas, full of particles of sand, coke, lime, dust, steam, soot, oily matters and tar, enters through the inlet pipe 12. The incoming gas strikes violently against the sharp turn in the pipe and is then forcibly directed downward against the bottom of the separator. The violent shaking which the gas receives in the pipe and against the floor of the separator causes the small bubbles of water which are in the acetylene and which contain steam and other impurities to be broken up and to fall with their contents to the bottom. Some of the water as well as other impurities come from the generator in the form of vapor, which is immediately condensed on reaching the cool separating chamber, and being heavier than acetylene, separate from the gas. The gas in entering the separator being directed downward by the inlet pipe, the current from the generator is broken, and uninterrupted flow of acetylene to the upper chamber is prevented. A large part of the impurities is in this way separated from the acetylene and deposited in the lower part of the separator before the gas has a chance to pass on.

The impurities having been thus shaken and condensed out of the crude gas, the acetylene rises to the top of the separating chamber and passes into the upper or filtration and drying chamber through the small opening 9 in its floor 8. It now passes through the raw cotton (not absorbent), or other filtering material with which the chamber is packed, and then enters the outlet pipe 13, pure and dry, to be distributed to the burners.

The peculiar construction of the purifier produces a remarkably high-grade acetylene, as the gas must pass through the filtering material and be thoroughly filtered and dried before entering the outlet pipe. The bottom of the chamber being sealed tight (except at the opening in its center which is plugged with the cotton packing or other filtering material), the gas cannot slide along its side into the outlet pipe without first entering the opening and filtering through the filtration material. The position of the internal opening of the outlet pipe in relation to the central opening in the floor of the chamber is a feature in the construction of great value in obtaining perfect filtration, as the gas is forced not only through but also across the cotton packing to reach the entrance of the outlet pipe.

Owing to the construction of the purifier, as well as to the elastic character of the filtration material the pressure of gas is automatically regulated in the generator and at the burners. This results in a great saving of carbid and a full yield of acetylene, as the pressure of gas is always substantially the same and consequently there is never an excess of water fed to the generator by an irregular or weak gas pressure.

When it is necessary to draw off the fluid impurities which have collected in the separator the plug 3 is removed and the material allowed to drain away.

It is apparent that the purifier may be readily taken apart and the filtering material readily changed in the filtration chamber, or that any other renewals or repairs may be easily made. It is also apparent that the full lengths of the inlet and outlet pipes within the purifier, being in contact with the side and end respectively of the purifier, stiffen these parts and are held thereby rigidly in position.

For fastening the purifier to any fixed support, such as the frame of an automobile, there is provided a bracket in the form of a yoke 15, rigid with a standard 16, fixed upon a base plate 17, provided with holes 18 for the attachment of fastening means. The yoke 15 is provided at its ends with holes 19 for the reception of bolts 20, whereby the ends of the metal strap 21 passing around the purifier are held in position, the ends of the strap being provided with holes to receive the bolt. The strap 21 is just beneath and in contact with the inlet pipe 12 whereby the purifier is prevented from slipping downwardly.

Although only the preferred form of this invention has been illustrated, the invention is not limited to the exact form shown, as various changes might be made in the construction without departing from the spirit of the invention or the scope of the claims.

Having thus fully described my invention, I claim and desire to protect by Letters Patent of the United States:

1. A gas purifier comprising a casing, having a cylindrical lower portion closed at its lower end, said lower end being provided with an aperture, a closure for said aperture, a cap having a closed top forming the upper end of said casing, an apertured diaphragm fixed in said cap and dividing the interior of the casing into an upper chamber and a lower chamber, an inlet pipe entering said lower chamber horizontally and extending vertically downward therein, in contact with one side thereof, and opening adjacent to the bottom thereof, an outlet pipe in said upper chamber extending horizontally in contact with the inner surface of said cap, and filtering material in said upper chamber.

2. A gas purifier comprising a casing, having a lower portion closed at its lower end, said lower end being provided with an aperture, a closure for said aperture, a cap forming the upper end of said casing, an apertured diaphragm fixed in said cap and dividing the interior of the casing into an upper chamber and a lower chamber, an inlet pipe entering said lower chamber horizontally and extending vertically downward therein and opening adjacent to the bottom thereof, an outlet pipe leading from said upper chamber, and filtering material in said upper chamber.

3. A gas purifier comprising a casing having a lower portion provided with an outlet at its lower end, a removable cap forming the upper end of said casing, an apertured diaphragm fixed in said cap and dividing the interior of the casing into an upper chamber and a lower chamber, an inlet pipe entering said lower chamber and extending downwardly therein, and opening adjacent to the bottom thereof, an outlet pipe leading from said upper chamber, and filtering material in said upper chamber.

4. A gas purifier comprising a casing having a lower portion provided with an outlet at its lower end, a cap threaded upon the upper end of said lower portion, an apertured diaphragm fixed in said cap and dividing the interior of the casing into an upper chamber and a lower chamber, an inlet pipe entering said lower chamber and extending downwardly therein and opening adjacent to the bottom thereof, an outlet pipe leading from said upper chamber, and filtering material in said upper chamber.

5. A gas purifier comprising a casing having a body portion provided with an outlet and with an inlet pipe entering therein, a cap removably mounted upon one end of said body portion, an apertured diaphragm fixed in said cap, and forming a filtering chamber in said cap, said cap being provided with an outlet pipe leading from said filtering chamber.

6. A gas purifier comprising a casing having a body portion closed at one end and open at the opposite end and provided with an outlet at the closed end, a cap having an apertured diaphragm fixed therein, said cap being removably mounted over the open end of said body and being provided with an outlet, an inlet pipe entering said body portion, and filtering material in said cap.

In witness whereof I have hereunto set my hand this 22nd day of December, 1908.

WILLIAM EASTERLY ASHTON.

Witnesses:
  A. I. GARDNER,
  ALEXANDER PARK.